United States Patent
Kourtev et al.

(10) Patent No.: US 9,466,157 B2
(45) Date of Patent: Oct. 11, 2016

(54) WHEEL ALIGNMENT MEASUREMENT

(71) Applicant: SKF B.V., Nieuwegein (NL)

(72) Inventors: Milen Kourtev, Säve (SE); Hendrik Anne Mol, Sleeuwijk (NL); Yosef Safi Harb, Amsterdam (NL); Edo Schramm, The Hague (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/406,441

(22) PCT Filed: Dec. 17, 2012

(86) PCT No.: PCT/EP2012/075807
§ 371 (c)(1),
(2) Date: Dec. 8, 2014

(87) PCT Pub. No.: WO2013/182258
PCT Pub. Date: Dec. 12, 2013

(65) Prior Publication Data
US 2015/0221144 A1 Aug. 6, 2015

(30) Foreign Application Priority Data

Jun. 6, 2012 (EP) .................................... 12171036

(51) Int. Cl.
*G07C 5/08* (2006.01)
*G01B 21/26* (2006.01)
(Continued)

(52) U.S. Cl.
CPC ......... *G07C 5/0808* (2013.01); *B60C 23/0488* (2013.01); *G01B 21/26* (2013.01); *G01M 17/013* (2013.01); *G01B 2210/20* (2013.01); *G01B 2210/24* (2013.01)

(58) Field of Classification Search
CPC .............. G01B 21/26; G01B 2210/20; G01B 2210/24
USPC .......................................... 701/34.4; 702/113
See application file for complete search history.

(56) References Cited

U.S. PATENT DOCUMENTS 6,098,296 A * 8/2000 Perisho et al. ................. 33/203
6,405,109 B1 6/2002 Kyrtsos et al.
(Continued)

FOREIGN PATENT DOCUMENTS

GB 2271968 A 5/1994
WO 2010107344 A1 9/2010

*Primary Examiner* — Stefanos Karmis
*Assistant Examiner* — Michael E Butler
(74) *Attorney, Agent, or Firm* — Bryan Peckjian; SKF USA Inc. Patent Dept.

(57) ABSTRACT

A method of onboard determination of vehicle wheel alignment is provided. In a first step, a lateral acceleration signal is generated, using an accelerometer mounted on the vehicle wheel. In a second step, a first lateral acceleration value $a_{y,Acc}$ is derived from a first portion of the lateral acceleration signal, which is during a longitudinal acceleration $a_0$ of the vehicle. In a third step, a second lateral acceleration value $a_{y,CS}$ is derived from a second portion of the lateral acceleration signal, which is measured when the longitudinal acceleration has ceased and the vehicle is travelling at constant speed. In a fourth step, the magnitude of the longitudinal acceleration $a_0$ associated with the first portion of the lateral acceleration signal is measured. In a fifth step, a toe angle $\alpha$ of the vehicle wheel is determined according to the following relationship:

$$\alpha = \arcsin\left(\frac{a_{y_{Acc}} - a_{y_{CS}}}{-a_0\cos\left(\arcsin\left(\frac{a_{y_{CS}}}{g}\right)\right)}\right) \cdot \frac{180}{\pi}$$

where g is the gravitational acceleration constant.

11 Claims, 3 Drawing Sheets

(51) Int. Cl.
*B60C 23/04* (2006.01)
*G01M 17/013* (2006.01)

(56) References Cited

U.S. PATENT DOCUMENTS

| | | | | |
|---|---|---|---|---|
| 7,415,771 | B2* | 8/2008 | Harrill | 33/264 |
| 7,467,473 | B2* | 12/2008 | Harrill et al. | 33/264 |
| 7,877,884 | B2* | 2/2011 | Harrill et al. | 33/264 |
| 7,974,806 | B1* | 7/2011 | Burns | G01B 11/2755 702/105 |
| 9,212,907 | B2* | 12/2015 | D'Agostino | G01B 21/26 |
| 2001/0030400 | A1* | 10/2001 | Zetterstrom | 280/5.51 |
| 2004/0194327 | A1* | 10/2004 | Bryan | 33/203.18 |
| 2005/0027473 | A1* | 2/2005 | Davidson | G01B 11/275 702/151 |
| 2009/0271137 | A1* | 10/2009 | Torri | G01B 21/26 702/104 |
| 2016/0018209 | A1* | 1/2016 | Nagornov | G01B 7/315 33/301 |
| 2016/0096403 | A1* | 4/2016 | Huang | G01M 17/02 701/34.4 |
| 2016/0138248 | A1* | 5/2016 | Conway | B62D 15/0295 701/32.3 |

* cited by examiner

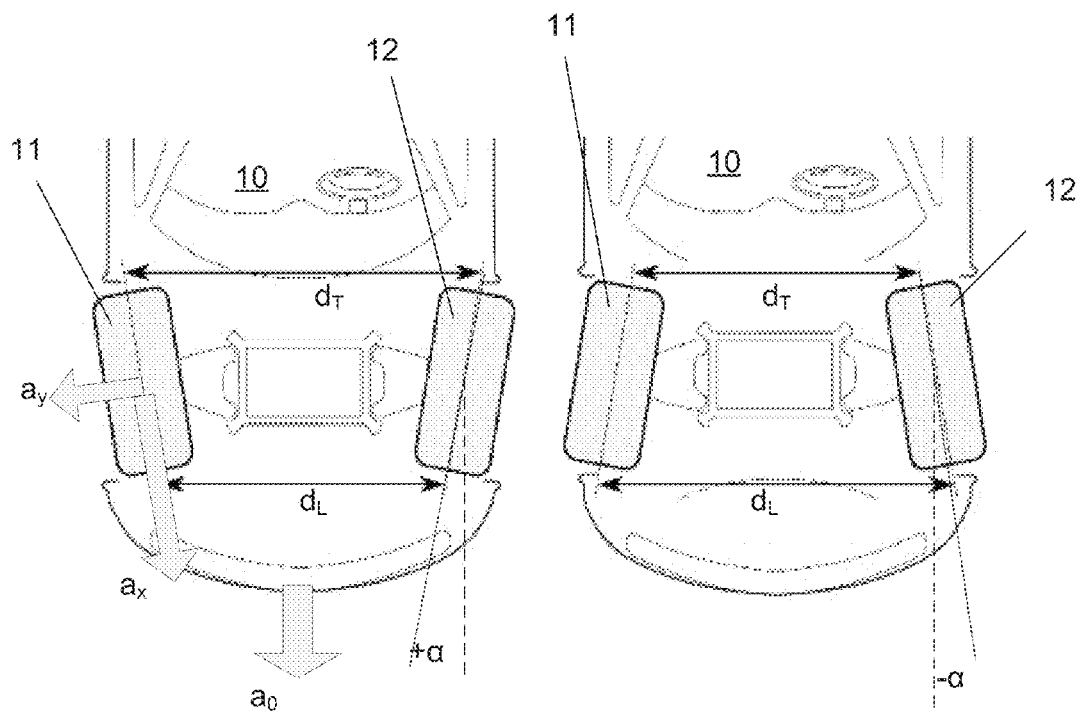
Fig. 1a
Fig. 1b
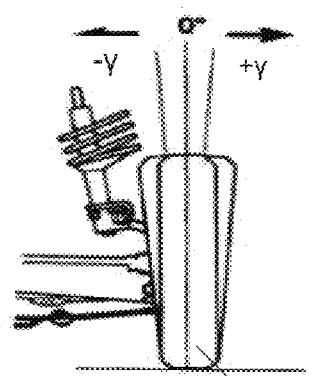
Fig. 1c

WHEEL ALIGNMENT MEASUREMENT

CROSS REFERENCE TO RELATED APPLICATION

This is a National Stage application claiming the benefit of International Application Number PCT/EP2012/075807 filed on 17 Dec. 2012, which claims priority to European Patent Application EP12171036 filed 6 Jun. 2012, both of which are herein incorporated by reference in their entirety.

FIELD OF THE INVENTION

The present invention relates to a method and a system for on-board measurement of vehicle wheel alignment.

BACKGROUND TO THE INVENTION

A common problem found in many trucks today is that their wheels and axles are incorrectly positioned. This incorrect position is too small for the human eye to see and the effects become noticeable only when the problem has become severe. The incorrect position is called wheel misalignment. Wheel misalignment leads to increased tire wear and fuel consumption and decreased control of the vehicle. Wheel misalignment can be due to components of a new truck setting in, bumps, potholes, suspension fatigue, or loading of the vehicle. It is therefore necessary to perform regular checks on the health of the vehicle.

If the truck owner decides to correct the problem of wheel misalignment, he has to take the vehicle to a service centre. The correction is done while the vehicle is at a standstill and without the extra weight of a cargo. The position of the wheel is then measured using alignment equipment. The position of the wheel is then altered by a technician till the values are within the recommended settings. Companies that perform wheel alignment commonly have a yearly check-up of their fleet. Midway the year, the truck wheels might already be misaligned, while the symptoms are too small to be noticed. This means that the truck might need to wait up to a year to be corrected.

This brings the need for onboard measurement equipment or dynamic alignment, to enable fleet operators to implement more effective maintenance programmes. The misalignment will be detected in an early phase, before causing too much damage to the tire. Dynamic alignment takes into consideration the loading pattern and dynamic behaviour of the vehicle whilst on the road, giving a more accurate measurement of the alignment angles.

SUMMARY OF THE INVENTION

The present invention resides in a method of onboard determination of vehicle wheel alignment. The method comprises a first step of generating a lateral acceleration signal using an accelerometer mounted on the vehicle wheel.

Preferably, the accelerometer is a three-axis accelerometer that is mounted on a side face of the wheel rim. It is also possible to use a two-axis accelerometer. The accelerometer is preferably mounted close to the centre of the wheel rim side face, to minimise the centrifugal forces acting on the accelerometer.

Suitably, the method further comprises a step of signal processing in which misalignment errors are removed and noise is filtered from the signal. Furthermore, as will be clear to the skilled person, the accelerometer is preferably calibrated after being mounted to the vehicle wheel.

In a second step, a first lateral acceleration value $a_{y\_Acc}$ is obtained from a first portion of the lateral acceleration signal. The first portion of the signal is measured during a period when the vehicle is accelerating in a longitudinal direction.

In a third step, a second lateral acceleration value $a_{y\_CS}$ is obtained from a second portion of the lateral acceleration signal. The second portion is measured when the longitudinal acceleration has ceased and the vehicle is travelling at constant speed.

In a fourth step, the magnitude $a_0$ of the longitudinal acceleration, associated with the first portion of the lateral acceleration signal, is measured. The longitudinal acceleration can be measured using the same accelerometer mounted on the wheel rim, or using a separate accelerometer that is mounted elsewhere on the vehicle, e.g. on the vehicle chassis.

In a fifth step, a toe angle $\alpha$ of the vehicle wheel is calculated according to the following relationship:

$$\alpha = \arcsin\left(\frac{a_{y_{Acc}} - a_{y_{CS}}}{-a_0 \cos\left(\arcsin\left(\frac{a_{y_{CS}}}{g}\right)\right)}\right) \cdot \frac{180}{\pi}$$

where g is the gravitational acceleration constant.

In a sixth step, the camber angle $\gamma$ of the vehicle wheel can also be calculated, using the following relationship:

$$\gamma = \arcsin\left(-\frac{a_{y_{CS}}}{g}\right) \cdot \frac{180}{\pi}.$$

When the calculated value of the toe angle or the camber angle falls outside of prescribed allowable values, an alert is generated. A fleet owner is thus able to schedule maintenance when it is truly required.

BRIEF DESCRIPTION OF THE DRAWINGS

The theory behind the method of the invention will now be explained in greater detail, with reference to the detailed description and to the drawings, in which:

FIGS. 1a and 1b schematically depict part of a vehicle in which the front wheels are shown in a toe-in position and in a toe-out position respectively;

FIG. 1c shows a vehicle wheel with a varying camber angle;

DETAILED DESCRIPTION

Figure 2:
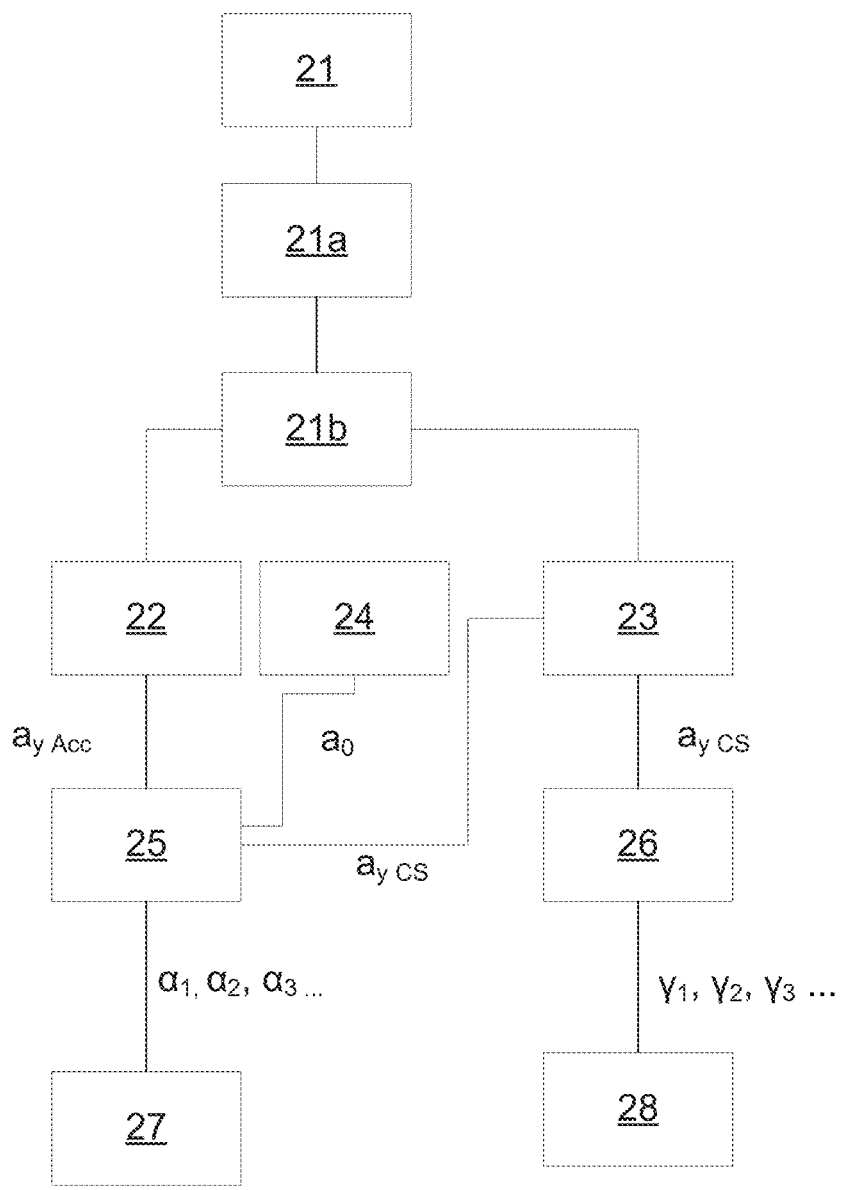
FIG. 2 is a flowchart of an embodiment of the method according to the invention.

To ensure that desired characteristics are obtained while driving, the toe and camber angles of vehicle wheels may be set to non-zero values. Toe angle is given by the difference in distance between the leading and trailing edges of a wheel set. In FIGS. 1a and 1b, the front wheels 11, 12 of a passenger vehicle 10 are shown. In FIG. 1a, a distance $d_L$ between the leading edges of the right 11 and left 12 front wheels is smaller than a distance $d_T$ between the trailing edges, which is referred to as a toe-in position. Correspondingly, each wheel has a toe angle $\alpha$, representing the angle to which the wheel is out of parallel with a longitudinal direction of the vehicle. Wheels in a toe-in position have a positive toe angle value +α.

The vehicle front wheels 11, 12 are depicted in a toe-out position in FIG. 1b, whereby the distance $d_L$ between the leading edges is greater than the distance $d_T$ between the trailing edges. Correspondingly, each wheel has a negative toe angle value −α.

During driving of a heavy truck, for example, a toe angle of zero is advantageous. But when the vehicle is moving, the wheels tend to toe-out. A slight toe-in setting (positive toe angle) of the wheels therefore enables to compensate for this. By ensuring that the vehicle wheels remain substantially at their optimal toe angle, tyre wear can be minimized and fuel consumption optimized, which is particularly important for the operators of commercial fleets. The present invention provides an onboard method of determining and monitoring toe angle, so that unacceptable deviations can be detected early.

The inventive method comprises measurement of wheel lateral acceleration, and is based on the understanding that detecting changes in toe angle relies on forward acceleration of the vehicle. With reference to FIG. 1a, let us assume that the vehicle 10 is accelerating in a forward direction. When the vehicle accelerates, the acceleration vector $a_0$ is broken down into two components at each wheel:
- a longitudinal acceleration $a_x$ in the longitudinal direction of the wheel 11, 12, which is responsible for the rotation of the wheel (when no longitudinal slip is present); and
- a lateral acceleration $a_y$ in the lateral direction of the wheel 11, 12, which causes slip.

The decomposition of the vehicle acceleration $a_0$ into longitudinal acceleration $a_x$ and lateral acceleration $a_y$ components is largely determined by the toe angle.

The greater the toe angle α, the greater the lateral component during acceleration. Wheel camber angle also plays a role, however, and must be taken into account.

As shown in FIG. 1c, which is a front view of the front left wheel 12 of the vehicle of FIGS. 1a and 1b, camber angle γ is the angle of the wheel 12 relative to vertical, as viewed from the front or the rear of the car. If the wheel leans in towards the chassis, it has negative camber; if it leans away from the car, it has positive camber.

In a truck, for example, the purposes of camber are twofold: to distribute the weight of the vehicle evenly on the tires and provide easy steering, by allowing the weight of the vehicle to be carried by the inner wheel bearing and spindle.

Too much or too little camber will cause tire wear and wear on the ball joints and bearings. Furthermore in the event of unequal camber, the vehicle will pull to the side with the greater camber. The method of the present invention further enables onboard monitoring of wheel camber angle.

The method comprises a step of measuring wheel lateral acceleration during vehicle acceleration. This may be done using e.g. an accelerometer that is mounted to a wheel rim of the wheel.

The general formula for deriving toe and camber from lateral acceleration is given by:

$$a_Y = -g \cdot \sin \gamma - a_0 \cdot \sin \alpha \cdot \cos \gamma \quad \text{[Equation 1]}$$

Where

| Parameter | Definition | Unit |
|---|---|---|
| $a_y$ | Lateral acceleration | m/s² |
| g | Gravitational acceleration | m/s² |
| γ | Camber angle | degrees |
| α | Toe angle | degrees |

-continued

| Parameter | Definition | Unit |
|---|---|---|
| $a_0$ | Vehicle acceleration in longitudinal direction | m/s² |

The method further comprises a step of measuring the vehicle acceleration $a_0$. This may be done using the same accelerometer mounted on the wheel rim, or may be measured at a different location on the vehicle.

By measuring $a_0$, Equation 1 then contains two unknowns: the camber angle γ and the toe angle α. Determination of the camber and toe angles according to the method of the invention lies in understanding the subtle lateral acceleration differences found during and after an acceleration manoeuvre. The camber angle is ever present in the measurement of lateral acceleration, as it depends on the constant gravitational acceleration. The toe angle, however, only reveals itself during an acceleration of the vehicle. It is therefore possible to solve Equation 1 for α and γ, by measuring the lateral acceleration at two instances.

The first instance is when the vehicle is accelerating, and the corresponding first lateral acceleration measurement will be referred to an accelerating lateral acceleration $a_{y, Acc}$.

The second instance is when acceleration has ceased and the vehicle is travelling at constant speed. The corresponding second lateral acceleration measurement will be referred to as a constant speed lateral acceleration, $a_{y, CS}$.

When the vehicle is travelling at constant speed, $a_0 = 0$, and Equation 1 becomes:

$$a_Y = -g \cdot \sin \gamma$$

The lateral acceleration can be assumed to equal the second lateral acceleration measurement, $a_{y, CS}$, meaning that the camber angle γ may be calculated according to the following relationship:

$$\gamma = \arcsin\left(-\frac{a_{Y_{CS}}}{g}\right) \cdot \frac{180}{\pi} \quad \text{[Equation 2]}$$

During vehicle acceleration, the lateral acceleration $a_y$ can be assumed to equal the first lateral acceleration measurement $a_{y, Acc}$. The toe angle α can therefore be calculated by substituting Equation 2 into Equation 1, to obtain the following relationship:

$$\alpha = \arcsin\left(\frac{a_{Y_{CS}} - a_{Y_{Acc}}}{-a_0 \cos\left(\arcsin\left(\frac{a_{Y_{Acc}}}{g}\right)\right)}\right) \cdot \frac{180}{\pi} \quad \text{[Equation 3]}$$

The method of the invention is depicted in the flowchart of the FIG. 2. In a first step 21, wheel lateral acceleration is measured using an accelerometer as described above, which generates a lateral acceleration signal. In practice, the accelerometer mounted on the wheel will measure not only the wheel accelerations, but also crosstalk due to the misalignment of the sensor on the wheel and the errors within the accelerometer. The accelerometer will also pick up noise coming from engine vibration, road vibration, wind and other outside factors.

The method therefore suitably comprises a step 21A of processing the lateral acceleration signal to remove crosstalk and/or misalignment errors.

In one embodiment, an algorithm is used to remove crosstalk.

The crosstalk error in a three-axis accelerometer comes from sensing the acceleration of other axes, which can be due to internal voltage effects of the accelerometers or other physical properties of MEMS-type devices. The accelerations with crosstalk are given by:

$$a_{X\,cross} = a_X + \text{crosstalk}_{XY} \cdot a_Y + \text{crosstalk}_{XZ} \cdot a_Z$$

$$a_{Y\,cross} = a_Y + \text{crosstalk}_{XY} \cdot a_X + \text{crosstalk}_{YZ} \cdot a_Z$$

$$a_{z\,cross} = a_z + \text{crosstalk}_{XZ} \cdot a_X + \text{crosstalk}_{YZ} \cdot a_Y$$

Where crosstalk$_{XY}$, crosstalk$_{XZ}$, crosstalk$_{YZ}$ are the percentages. Typical crosstalk errors lie between 1-2 percent.

Solving for the original signal gives the following equation for the lateral acceleration signal:

$$a_Y = \frac{(a_{X_{cross}} \cdot (\text{crosstalk}_{XY} - \text{crosstalk}_{XZ} \cdot \text{crosstalk}_{YZ}))}{\begin{pmatrix} \text{crosstalk}_{XY}^2 - 2 \cdot \text{crosstalk}_{XY} \cdot \text{crosstalk}_{XZ} \cdot \\ \text{crosstalk}_{YZ} + \text{crosstalk}_{XZ}^2 + \text{crosstalk}_{YZ}^2 - 1 \end{pmatrix}} +$$

$$\frac{(a_{z_{cross}} \cdot (\text{crosstalk}_{YZ} - \text{crosstalk}_{XY} \cdot \text{crosstalk}_{XZ}))}{\begin{pmatrix} \text{crosstalk}_{XY}^2 - 2 \cdot \text{crosstalk}_{XY} \cdot \text{crosstalk}_{XZ} \cdot \\ \text{crosstalk}_{YZ} + \text{crosstalk}_{XZ}^2 + \text{crosstalk}_{YZ}^2 - 1 \end{pmatrix}} + \frac{(a_{Y_{cross}} \cdot (\text{crosstalk}_{XZ}^2 - 1))}{\begin{pmatrix} \text{crosstalk}_{XY}^2 - 2 \cdot \text{crosstalk}_{XY} \cdot \text{crosstalk}_{XZ} \cdot \\ \text{crosstalk}_{YZ} + \text{crosstalk}_{XZ}^2 + \text{crosstalk}_{YZ}^2 - 1 \end{pmatrix}} +$$

The terms crosstalk$_{XY}$, crosstalk$_{XZ}$, crosstalk$_{YZ}$ can be determined through experimentation. This removes the crosstalk X (longitudinal) and Z (vertical) acceleration terms, to obtain a processed lateral acceleration signal that is largely error free.

Alternatively, depending on the accelerometer used, the internal crosstalk effects may be negligible, in which case it is sufficient to determine a constant offset during the calibration of the sensor, which offset is then subtracted from the lateral acceleration signal.

The processed signal now contains part acceleration data and part noise. The method suitably further comprises a further step 21B of filtering the processed signal to remove the noise. The important acceleration data has an almost constant value and thus has a very low frequency; the noise has a high frequency. By introducing a low pass filter, the noise will be filtered out to an acceptable extent.

Figure 3:
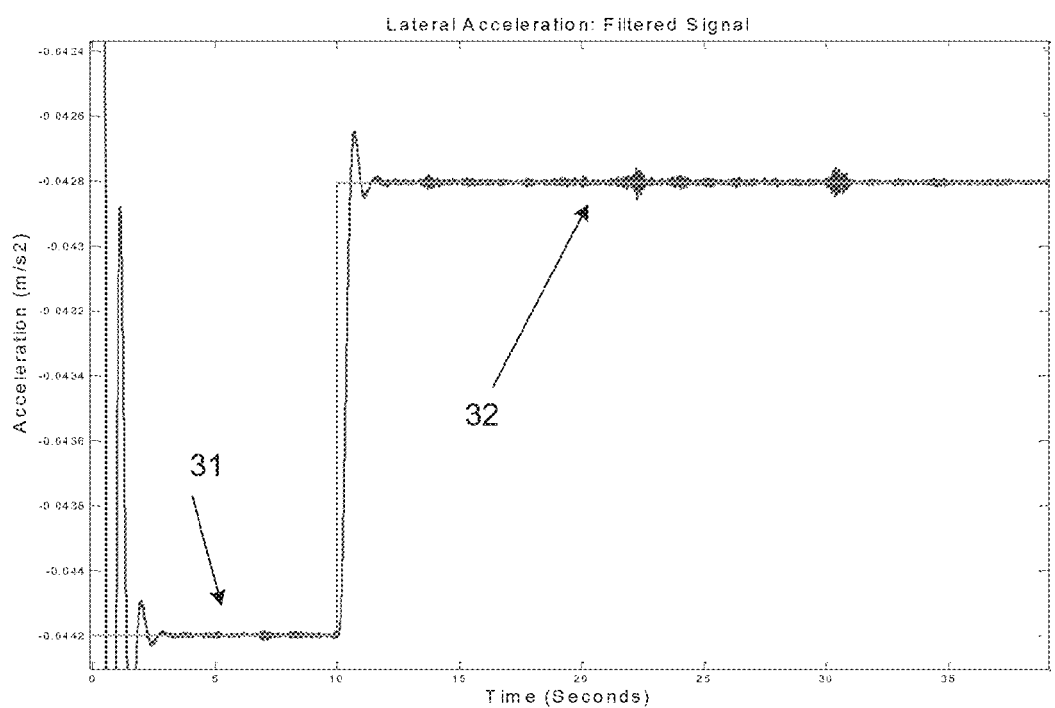
FIG. 3 shows a plot of a lateral acceleration signal measured during a period of longitudinal vehicle acceleration followed by a period of vehicle constant speed.

An example of a filtered lateral acceleration signal is shown in FIG. 3. The signal comprises a first portion 31 and a second portion 32. The first portion 31 is obtained while the vehicle is accelerating in a forward direction; the second portion 32 is obtained immediately after the acceleration has ceased, while the vehicle is moving at constant speed. The first and second portions are separated by a distinct jump. In this example, a 4$^{th}$ order Butterworth filter with cutoff frequency 0.01 Hz was used. The Butterworth filter has a very flat frequency response, which is useful in the sharp jump that occurs after the acceleration stops. It is also possible to use other types of filter and other cutoff frequency values.

The accelerating lateral acceleration $a_{y\,Acc}$, is obtained from the first portion 31 of the signal in a second step 22 of the inventive method (refer FIG. 2) and the constant speed lateral acceleration $a_{y\,CS}$ is obtained from the second portion 32 of the signal in a third step 23 of the method. Suitably, steps 22 and 23 of the method comprise averaging the first and second portions of the signals in order to obtain and average values for $a_{y\,Acc}$ and $a_{y\,CS}$ respectively.

As mentioned before, the method further comprises a fourth step 24 of measuring the magnitude of the forward acceleration $a_0$ of the vehicle.

In a fifth step 25, toe angle is calculated from the average values for $a_{y\,Acc}$ and $a_{y\,CS}$ and from the magnitude of the forward acceleration $a_0$, using Equation 3.

Suitably, the preceding steps of the method are repeated in order to obtain a series of toe angle values $\alpha_1, \alpha_2, \alpha_3 \ldots$ and the method comprises a further step 27 in which the series of toe angle values are averaged, to obtain an average toe angle value.

The method of the invention may also comprise a sixth step 26 of calculating camber angle from the constant speed lateral acceleration $a_{y\,CS}$, obtained in step 23. Again, the preceding steps of the method are suitably repeated, to obtain a series of camber angle values $\gamma_1, \gamma_2, \gamma_3 \ldots$ and the method may comprise a further step 28 of calculating an average camber angle from the series $\gamma_1, \gamma_2, \gamma_3 \ldots$.

Thus, the method of the invention provides a straightforward way of onboard determination of wheel toe angle and wheel camber angle, enabling early detection of misalignment.

A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

The invention claimed is:

1. A method of onboard determination of wheel alignment of a vehicle, the method comprising:
   providing the vehicle having a plurality of wheels;
   providing an accelerometer configured to be placed on a wheel of the plurality of wheels;
   providing a processor in the vehicle and in communication with the accelerometer;
   operating the vehicle;
   during the operation of the vehicle the accelerometer transmitting a lateral acceleration signal to the processor, the lateral acceleration signal corresponding to a lateral acceleration of the wheel, the lateral acceleration signal having a first portion and a second portion, the first portion is measured during a longitudinal acceleration $a_0$ of the vehicle, the second portion is measured when the longitudinal acceleration has ceased and the vehicle is travelling at constant speed;
   during operation of the vehicle the processor automatically and continuously monitoring the lateral acceleration of the wheel using the lateral acceleration signal,
   the processor automatically processing the lateral acceleration signal to remove crosstalk from the lateral acceleration signal;
   after processing the lateral acceleration signal the processor automatically and continuously filtering the lateral acceleration signal to remove noise during operation of the vehicle;
   the processor automatically transforming data from the first portion of the lateral acceleration signal to obtain a first lateral acceleration value $a_{y\,Acc}$;

the processor automatically transforming data from the second portion of the lateral acceleration signal to obtain a second lateral acceleration value $a_{y\_CS}$;

the processor automatically determining the longitudinal acceleration $a_0$ associated with the first portion of the lateral acceleration signal;

the processor automatically transforming the data associated with the longitudinal acceleration $a_0$, the first lateral acceleration value $a_{y\_Acc}$, and the second lateral acceleration value $a_{y\_CS}$ to generate data representing a toe angle $\alpha$ of the wheel of the vehicle, the processor transforming the data as follows:

$$\alpha = \arcsin\left(\frac{a_{y_{Acc}} - a_{y_{CS}}}{-a_0 \cos\left(\arcsin\left(\frac{a_{y_{CS}}}{g}\right)\right)}\right) \cdot \frac{180}{\pi}$$

wherein g is a gravitational acceleration constant, while the vehicle is in operation repeating the steps of transmitting the lateral acceleration signal to the processor, the processor automatically and continuously monitoring the lateral acceleration, the processor automatically removing crosstalk, the processor automatically and continuously filtering the lateral acceleration signal, the processor automatically transforming data, the processor automatically determining the longitudinal acceleration, and the processor automatically transforming the data to generate data representing the toe angle in order to generate a plurality of toe angles during operation of the vehicle;

averaging the plurality toe angles to create an averaged toe angle;

generating an alert when the averaged toe angle falls outside an allowable range to notify a driver that maintenance is needed.

2. The method according to claim 1, further comprising a step of the processor automatically transforming the data associated with the second lateral acceleration value $a_{y\_CS}$ to generate data representing a camber angle $\gamma$, in degrees, of the wheel of the vehicle, the processor transforming the data as follows:

$$\gamma = \arcsin\left(-\frac{a_{Y_{CS}}}{g}\right) \cdot \frac{180}{\pi}.$$

3. The method of claim 2, wherein the steps of the accelerometer transmitting a lateral acceleration signal to the processor, the processor automatically transforming data from the first portion of the lateral acceleration signal, the processor automatically transforming data from the second portion of the lateral acceleration signal, the processor automatically determining the longitudinal acceleration $a_0$, the processor automatically transforming the data to generate data representing the toe angle $\alpha$, and the processor automatically transforming the data to generate data representing a camber angle $\gamma$, are repeated at least once in order to determine several values for the camber angle, and the method further comprises a step of calculating an average camber angle from the several camber angle values.

4. The method claim 1, wherein the accelerometer mounted on the wheel of the vehicle is further used in the step of measuring the longitudinal acceleration $a_0$.

5. The method of claim 1, wherein the accelerometer is mounted on a wheel rim of the wheel of the vehicle.

6. The method according to claim 5, wherein the accelerometer is mounted on a side face of the wheel rim, close to a rotation axis of the wheel.

7. The method of claim 1, wherein the accelerometer is part of a tire pressure monitoring system.

8. The method of claim 1, comprising a further step of removing errors from the lateral acceleration signal, wherein the errors are due to one of internal misalignment within the accelerometer and to a mounting misalignment of the accelerometer.

9. The method of claim 1, wherein the lateral acceleration signal is filtered using a low pass filter or a bandpass filter.

10. The method of claim 1, wherein the step of obtaining the first lateral acceleration value $a_{y\_Acc}$ provides taking an average value of the first portion of the lateral acceleration signal.

11. The method of claim 1, wherein the step of obtaining the second lateral acceleration value $a_{y\_CS}$ comprises taking an average value of the second portion of the lateral acceleration signal.

* * * * *